UNITED STATES PATENT OFFICE.

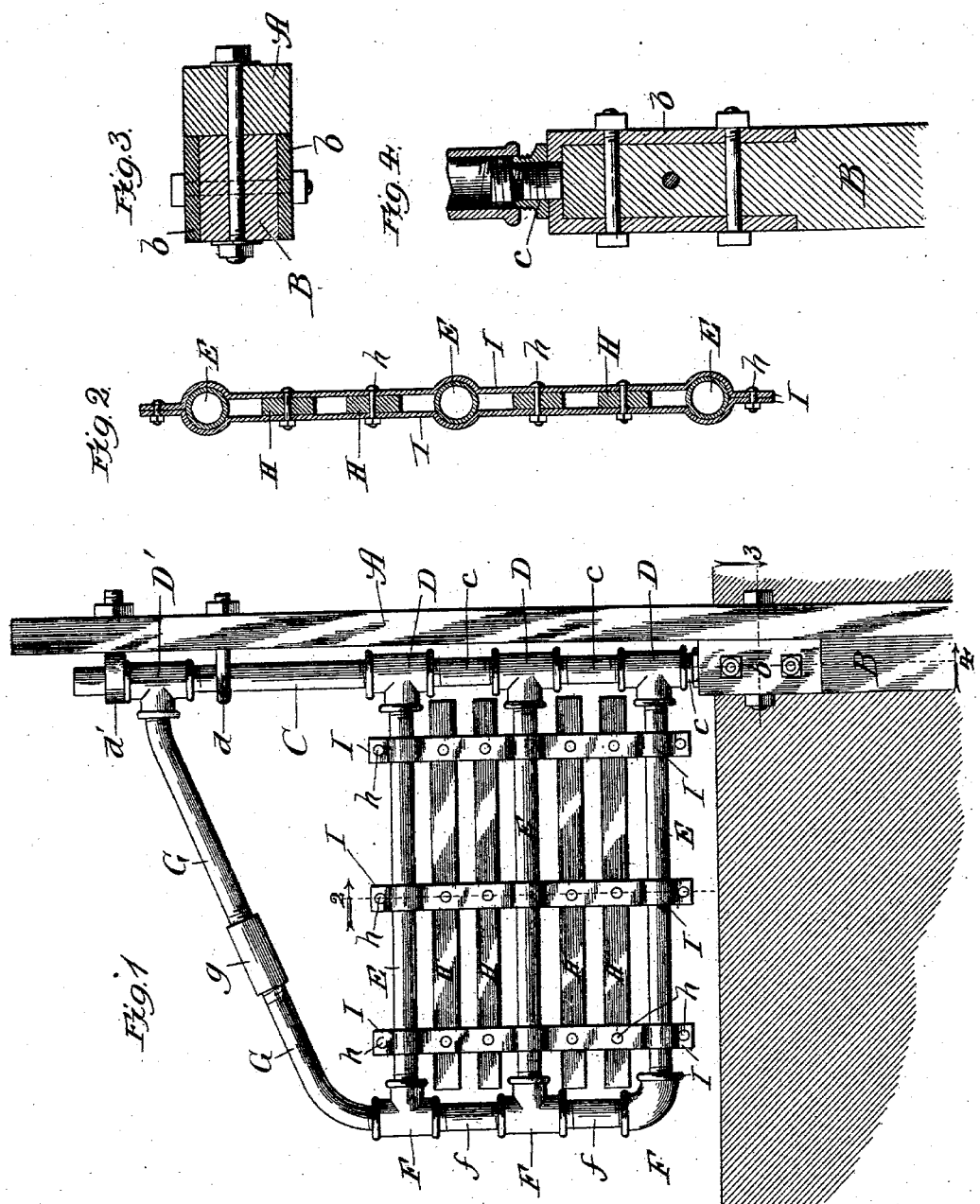

ROLLA J. PARKER AND JAMES H. BANKER, OF NEWTON, AND HENRY U. MUDGE, OF TOPEKA, KANSAS.

GATE.

SPECIFICATION forming part of Letters Patent No. 634,066, dated October 3, 1899.

Application filed November 7, 1898. Serial No. 695,780. (No model.)

*To all whom it may concern:*

Be it known that we, ROLLA J. PARKER and JAMES H. BANKER, of Newton, and HENRY U. MUDGE, of Topeka, Kansas, have invented certain new and useful Improvements in Gates, of which the following is a specification.

The object of our invention is to make a stock-yard gate which shall combine cheapness, lightness, strength, and durability for use in cattle-loading pens, at railway-stations, and in stock-yards; and our invention consists in the features and details of construction hereinafter described and claimed.

In the drawings, Figure 1 is a side elevation of our improved gate; Fig. 2, a section taken on line 2 of Fig. 1, looking in the direction of the arrow; Fig. 3, a plan view taken on line 3 of Fig. 1, looking in the direction of the arrow; and Fig. 4, a longitudinal sectional elevation taken in line 4 of Fig. 1, looking in the direction of the arrow.

In making our improved stock-yard gate we use a main post A, that is intended to be set in the ground to the requisite depth and to be of the requisite size to give it firmness in its upright position. This post is intended to have a supplementary block B at its lower end, which may be bolted or otherwise secured to the main post. The supplementary block is intended to extend up to the top of the ground and to afford a foot-block or support for the gate. It is intended to be provided with a U-shaped metal strap $b$, well illustrated in Fig. 4, which has a hole in its upper end to receive the lower end of the main vertical bar C of the gate-frame and serves as a journal for the same, resting upon the supplementary block B. The vertical rear frame-bar C is made of hollow sections of gas-pipe $c$, which are threaded at their ends and screwed into T-shaped couplings D and D', screw threaded to receive them, as will be well understood by reference to Fig. 1. The vertical rear frame rail or post C in addition to being journaled in the step or foot-block B is connected to the main post by a staple $d$ and an eyebolt $d'$, which are held in place by nuts on the rear of the main post. The eyebolt is intended to rest upon the upper or topmost coupling D', so that the rear frame-bar cannot be moved or raised in a vertical direction. Sections of gas-pipe E of the desired length for the width of the gate are screwed into the couplings D, so as to extend longitudinally or horizontally out therefrom, forming the upper and lower and intermediate longitudinal rails of the gate. The outer ends of the horizontal sections of gas-pipe are threaded and screwed into T-shaped couplings F, into which are also screwed short sections of gas-pipe $f$, so as to form the vertical front bar or rail of the gate.

The top bar of the gate is formed of sections of gas-pipe G, screwed into the upper or top couplings on the vertical end and rear bars of the gate and connected together by a coupling $g$. By turning this coupling the top bar of the gate can be adjusted in length so as to hold the outer or free end of the gate in its desired position above the ground. This top bar inclines upward from the free or outer end of the gate to its point of connection with the rear vertical post, so that it forms a brace, which more securely sustains the outer end of the gate from clogging or being broken down should cattle attempt to go over it.

Between the horizontal or longitudinal bars or rails E of the gate are arranged a desired number of wooden slats H. These wooden slats are held and retained in place by vertical cross pieces or supports I, each formed of two straps, one on each side of the longitudinal rails and bent at their intersection with the horizontal or longitudinal bars or rails so as to embrace them and yet between such bars rest against the wooden slats. The slats can be held in place by bolts $h$, passing through them and the vertical straps. This arrangement and construction will be understood by an examination of Figs. 1 and 2 of the drawings.

All the parts of the gate may be made at the shop and shipped dismantled to the place of use, where they may be readily assembled into the completed gate ready to be mounted in place.

We may say that our stock-yard gate as above described has during the present year been introduced into use on the Santa Fé Railway system and that it possesses a number of advantages over the old wooden gates, which it is displacing. It possesses great superiority in strength over such old gates, although it weighs some two hundred pounds less. It is made of a number of pieces of gas-pipe and parts connected with T's and couplings, so that it can be shipped dismantled and readily assembled at the place of use. If any of its parts become broken or injured, they can easily be removed and others substituted in their place, so that repairing involves but little time and expense. All danger of its falling out of its hinges and injuring stock or persons through the settling of the gate-posts is obviated. It is practically indestructible as compared with the old wooden gates, in which the wood after being used a short time becomes brittle and easily breaks. In a word, our new iron gate is lighter, safer, less expensive in construction, less expensive in repair, less expensive in shipment, less dangerous in use, and more durable than any wooden gates which we are acquainted with.

We claim—

1. The combination, in a gate, of upper and lower longitudinal rails and front and rear vertical rails consisting of gas-pipe united by couplings, a series of longitudinal slats extending across the space between the front and rear vertical rails, and a series of vertical cross-supports having cross bends or curves, receiving and supporting the longitudinal slats, and united at their top and bottom ends to the longitudinal upper and lower rails by bends or curves encircling and clasping such rails, for giving the gate rigidity and strength, substantially as described.

2. The combination, in a gate of upper and lower longitudinal rails and front and rear vertical rails consisting of gas-pipe united by couplings, a series of longitudinal slats extending across the space between the front and rear vertical rails, a series of vertical cross-supports receiving and supporting the longitudinal slats, said supports having cross bends or curves and united at their top and bottom to the longitudinal upper and lower rails by the bends or curves encircling and clasping such rails, and a diagonally-running upper rail formed of gas-pipe sections united by a right and left hand coupling and entered at its lower or front end into the rail-coupling at the upper front corner, for strengthening, stiffening and supporting the gate, substantially as described.

3. The combination, in a gate, of upper and lower longitudinal rails and front and rear vertical rails consisting of gas-pipe united by couplings, a series of longitudinal slats, a series of vertical cross-supports receiving and supporting the longitudinal slats, said supports having cross bends or curves and united to the upper and lower rails by the bends or curves encircling and clasping such rails, a lower trunnion entered into the lower rear corner coupling, a post at the rear for hanging the gate, and a block at the lower end of the rear post united thereto and provided with a top strap through which passes the lower trunnion of the gate to rest on and be supported by the end of the block, substantially as described.

4. The combination, in a gate, of upper and lower longitudinal rails and front and rear vertical rails consisting of gas-pipe united by couplings, a diagonal upper rail formed of gas-pipe sections united to each other by a right-and-left coupling and having its lower or front end entered into the rail at the upper front corner coupling, for furnishing a take-up brace supporting the gate proper, a series of longitudinal slats, a series of vertical cross-supports receiving and supporting the longitudinal slats, said supports having cross bends or curves and united to the upper and lower longitudinal rails by the bends or curves encircling and clasping such rails, a trunnion entered into the lower rear corner coupling, a rear post for hanging the gate, and a block on the lower end of the post for furnishing a rest for the lower trunnion, substantially as described.

ROLLA J. PARKER.
JAMES H. BANKER.
HENRY U. MUDGE.

Witnesses to signatures of Parker and Banker:
W. J. TROUSDALE,
JOHN C. NICHOLSON.

Witnesses to signature of Mudge:
A. S. RANKIN,
E. B. WHITMORE.